United States Patent [19]

O'Sullivan et al.

[11] 3,919,083
[45] Nov. 11, 1975

[54] TREATMENT OF FLOATING POLLUTANTS

[75] Inventors: Denis J. O'Sullivan, Sutton; Bernard J. Bolger, Foxrock, both of Ireland

[73] Assignee: Loctite (Ireland) Limited, Dublin, Ireland

[22] Filed: Oct. 4, 1973

[21] Appl. No.: 403,701

Related U.S. Application Data

[63] Continuation-in-part of Ser. No. 159,572, July 2, 1971, abandoned.

[52] U.S. Cl. ............. 210/54; 210/59; 210/DIG. 21
[51] Int. Cl.² ........................................ C02B 9/02
[58] Field of Search ............ 210/40, 42, 47, 54, 59, 210/DIG. 21

[56] References Cited
UNITED STATES PATENTS

| | | | |
|---|---|---|---|
| 2,763,677 | 9/1956 | Jeremias | 260/465.4 |
| 2,776,232 | 1/1957 | Shearer et al. | 260/465.4 |
| 3,352,778 | 11/1967 | Brink et al. | 210/40 X |
| 3,415,745 | 12/1968 | Isaacson et al. | 210/54 |
| 3,497,450 | 2/1970 | Roth | 210/40 X |
| 3,520,806 | 7/1970 | Haigh | 210/40 |
| 3,536,616 | 10/1970 | Kondoh et al. | 210/40 |
| 3,755,189 | 8/1973 | Gilchrist et al. | 210/42 X |

FOREIGN PATENTS OR APPLICATIONS

| | | | |
|---|---|---|---|
| 979,978 | 1/1965 | United Kingdom | 210/DIG. 21 |

*Primary Examiner*—Thomas G. Wyse
*Attorney, Agent, or Firm*—Jean B. Mauro; J. Rodney Reck

[57] ABSTRACT

Water-borne pollutants, particularly those of oleaginous nature, may be treated with monomers which polymerize in the presence of moisture, preferably, monomeric esters of 2-cyanoacrylic acid. Upon polymerization, significant portions of the pollutant are incorporated within a polymer matrix, thus reducing the danger to shore and marine ecology and aesthetics.

12 Claims, No Drawings

TREATMENT OF FLOATING POLLUTANTS

CROSS-REFERENCE TO RELATED APPLICATION

This is a Continuation-in-Part of our copending application, Serial No. 159,572, filed July 2, 1971, now abandoned.

BACKGROUND OF THE INVENTION

Significant damage frequently is done to marine and shore life by oil spilled at sea. Spillages include those occurring through shipwreck or other such accidental damage to ships, in particular ocean-going tankers, and those deliberately or negligently committed, as when ships' oil tanks are being cleaned or waste or surplus oil is jettisoned. The damage is primarily to marine and coastal life forms, and to coastal amenities for people. Rivers and lakes are sometimes affected in addition to the open sea, where the greater part of such pollution originates. Sea birds and shellfish, minute marine life forms and the larger animals which depend on them for food, marine and terrestrial coastal flora can be destroyed, frequently in large quantity. Ecological disturbances of unknown, unpredictable and uncontrollable extent can be perpetrated. Beaches and foreshores can be rendered dirty and repellent. Large tourist areas can be deprived of a major source of income.

Similar problems can be caused by water-borne pollutants other than oil. For example, hazards of a nature similar to those described above can be caused by water-immiscible organic and inorganic solids.

Methods and compositions for controlling, reducing and eliminating the menace and damage of floating, water-borne pollutants, are actively sought and are of great importance to today's and tomorrow's civilization. Heretofore, pollutant control has been attempted by procedures which form a polymeric envelope or film around the pollutant, as by applying a preformed polymer in solution or hot melt form. Such techniques have not been deemed fully satisfactory for various reasons, e.g., the difficulty of forming a continuous envelope and the difficulty of keeping the envelope intact during removal operations. Such problems are substantially alleviated by the present invention, by which the pollutant is incorporated into an easily-handled polymeric mass.

THE INVENTION

This invention relates to compositions and processes for the treatment of oil slick and other floating water-borne pollutants of water expanses and their margins, so as to reduce the threat of such pollutants to the surroundings. It is concerned in particular with a chemical treatment of such pollutants which incorporates them in a solid, semi-solid, reticulate or honeycomb-like mass or matrix, and reduces or destroys their propensity to cling to objects with which they come in contact.

The present invention provides a method for reducing the menace of floating water-borne pollutants of water expanses and their margins which comprises applying to such pollutants a composition containing at least one substance which polymerizes thereupon to a matrix with incorporation of at least a portion of the pollutant.

The compositions used in the above process commonly are those containing polymerizable esters of 2-cyanoacrylic acid. These esters can comprise the total of the composition, but other ingredients may advantageously be incorporated, as is discussed more fully below.

DISCUSSION OF THE INVENTION AND ITS PREFERRED EMBODIMENTS

As used herein, "pollutants" refers broadly to floating water-immiscible or insoluble contaminants of oceans, lakes, rivers, etc. The most common and troublesome of these are oleaginous in nature. Oleaginous pollutants generally are hydrocarbon oils, but can be essentially any organic liquid which floats in film-like form, or in smaller discrete globules, on the surface of the water in oil-like fashion. As indicated above, solid and insoluble pollutants also are encountered and frequently can be treated with the compositions and processes disclosed herein.

In its broadest aspect, the active ingredient in the composition disclosed herein for treating pollutants is a monomer polymerizable in the presence of moisture, preferably, a polymerizable ester of 2-cyanoacrylic acid. Such esters generally correspond to the formula

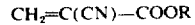

$$CH_2=C(CN)-COOR$$

wherein R is a $C_{1-16}$ alkyl or alkenyl, a cyclohexyl or a phenyl group. Alkyl or alkenyl alcoholic moieties of greater than 16 carbon atoms can be used, but such compounds are rare. The esters may be used in monomer or oligomeric form. Preferably, R will be a $C_1$–$C_6$ group, and more preferably, a $C_1$–$C_4$ alkyl group.

Cyanoacrylate esters may be stabilized by the addition of one or more sultones, sulfur dioxide, or other stabilizers of the prior art which prevent their premature polymerization. Another class of common stabilizers are the free radical polymerization inhibitors, such as benzoquinone and hydroquinone.

It is desirable to incorporate a solvent or diluent in the composition disclosed herein for pollution treatment in order to make the process more economical. Liquid low molecular weight hydrocarbons (e.g., 10 carbons or less such as the common aromatics) may be used, but halogenated hydrocarbons have been found preferable, particularly those of 10 carbon atoms or less, particularly methylene chloride (1,1,1-trichloroethane), and others with 3 or less carbon atoms. The proportion of such solvent is not critical and proportions in the range 10% to 80% by weight of the composition have been used with success.

While there is no intention to be bound to any particular theory, when applied to a floating film or droplets of pollutant on water, the compositions disclosed herein, particularly the cyanoacrylate ester dissolved in a halogenated hydrocarbon, are believed to penetrate, i.e., dissolve, diffuse or disperse, at least partially, therein, and then polymerize to a solid, semi-solid or reticulate mass or matrix incorporating the pollutant. While the polymerizable monomer may be used in undiluted form, use of a solvent may aid in diffusion of the monomer into the pollutant mass. The composite mass which is formed may float or sink depending on its density relative to that of the fresh or salt water. If it floats, as is frequently preferred, it may be swept or raked up mechanically and disposed of. If it sinks, the preponderance of the pollution threat is also removed. In either case, the pollutant is incorporated and enclosed in a chemically and physically innocuous form. As a general rule, the polymerized matrix which results from the treatment of an oil slick in accordance with the invenoily trace, nor does it contaminate sand, clothing, vegetation or aquatic creatures with oil.

Supplementary or complementary techniques can be used without deviating from the broad scope of this invention. For example, agents may be added to the composition to aid in dispersion or dissolution of the polymerizable monomer in the pollutant. Also, the pollutant can be treated with a solid adsorbent prior to or contemporaneously with the composition disclosed herein.

Application of the composition containing the polymerizable ester to the floating pollutant may be by any convenient method. Naturally, it is desired to obtain a relatively uniform distribution of the composition over the area of the pollutant, or the portion thereof which is being treated. The most convenient method of application is by spraying, such as from a pressurized cylinder containing the composition.

The invention will be better understood from the following examples, which are merely illustrative and in no way limiting.

EXAMPLE I

Incorporation of the oil into a polymeric mass.

Approximately six grams of a solution of 20% methyl 2-cyanoacrylate by weight of solution in methylene chloride was poured on a simulated fresh water oil slick (approx. 1 inch in diameter, weighing 0.6g). Apparent total incorporation of the oil was achieved, followed by immediate precipitation of the polymer mass. Total precipitation was achieved. The oil used was that sold under the brand name Shell Vitrea Oil.

EXAMPLE II

Incorporation of the oil, and its removal as a low density polymeric mass.

Approximately six grams of a solution of 30% methyl 2-cyanoacrylate in methylene chloride was poured on a simulated salt water oil slick (approx. 0.6g Shell Vitrea Oil). Apparent total incorporation of the oil was achieved and the polymer mass remained on the surface. The resultant polymer was removed mechanically from the surface of the salt water and, when tested, did not contaminate filter paper with oil.

EXAMPLE III

Approximately five grams of a solution of 40% methyl 2-cyanoacrylate in methylene chloride was poured on an oil slick (Shell Vitrea Oil; 0.6g). Apparent total incorporation of the oil was achieved, as the monomer rapidly reacted upon contact with moisture to form a harmless polymer. The polymer mass remained on the surface of the salt water and was easily removed, though now innocuous, by raking in.

EXAMPLE IV

Approximately five grams of a solution of 20% methyl 2-cyanoacrylate in methylene chloride was poured on an oil slick weighting 0.7g. Apparent total incorporation of the oil was achieved, followed by immediate precipitation of the polymer mass. The oil used was that sold under the brand name Castrol Deusol Oil.

EXAMPLE V

Approximately three grams of a solution of 50% methyl 2-cyanoacrylate in 1,1,1-trichloroethane was poured on an oil slick (Castrol Deusol Oil 0.6g). Apparent total incorporation of the oil was achieved followed by immediate precipitation.

EXAMPLE VI

The preceding examples are repeated using benzene as the solvent. Similar results are obtained, i.e., the pollutant was incorporated into a polymer mass which could be easily removed from the water.

EXAMPLE VII

Approximately 30% by weight, based on the pollutant weight, of undiluted methyl-2-cyanoacrylate is applied to an oil slick, as in the preceding examples. It is found that the pollutant is efficiently incorporated into the polymeric matrix formed by the polymerization of the cyanoacrylate monomer, and can easily be removed from the water, as in the preceding examples.

EXAMPLE VIII

The preceding examples are repeated using ethyl-2-cyanoacrylate and mixtures of the latter with methyl-2-cyanoacrylate. Similar results are obtained, i.e., the reaction proceeded at about a rapid rate with incorporation of the pollutant into a polymer mass which could be easily removed from the water.

EXAMPLE IX

Example VII is repeated using butyl-2-cyanoacrylate. The polymerization rate is relatively slow compared with the lower alkyl cyanoacrylates. However, it is found that significantly improved reaction rates are achieved by prespraying the pollutant surface with known activators for the cyanoacrylate polymerization. The preferred activators include those of the types disclosed in U.S. Pat. Nos. 3,625,930 and 3,640,972. These include compounds containing either a

or a

group as well as imino- or unsaturated aliphatically substituted derivatives of S-triazine, hexahydro-S-triazine or pyrimido [5,4-$d$] pyrimidine.

We claim:

1. A process for reducing the menace of a floating water-borne pollutant which comprises applying to at least a portion of such pollutant a liquid composition containing a polymerizable monomeric or oligomeric ester of 2-cyanoacrylic acid or solution thereof, said ester polymerizing after contact with said pollutant to form a solid matrix with incorporation therein of at least a portion of said pollutant.

2. The process of claim 1, wherein the pollutant is an oleaginous material.

3. The process of claim 1 wherein the ester of 2-cyanoacrylic acid has the formula $CH_2=C(CN)-COOR$ wherein R is a $C_{1-16}$ alkyl or alkenyl, a cyclohexyl or a phenyl group.

4. The process of claim 3 wherein R is a $C_1-C_6$ group.

5. The process of claim 4 wherein the ester of 2-cyanoacrylic acid has the formula $CH_2=C(CN)-COOR$ wherein R is a $C_{1-16}$ alkyl or alkenyl, a cyclohexyl or a phenyl group, and is in a solvent of a liquid hydrocarbon or halogenated hydrocarbon.

6. The process of claim 3 wherein R is a $C_1-C_4$ alkyl group.

7. The process of claim 1 wherein the composition comprises a mixture of a polymerizable ester of 2-cyanoacrylic acid and a solvent therefor.

8. The process of claim 7 wherein the solvent comprises from about 10% to about 80% by weight of the mixture of solvent and ester of 2-cyanoacrylic acid.

9. The process of claim 1 wherein the composition is applied to the pollutant by spraying thereon.

10. The process of claim 1 wherein the matrix has a density which is less than the specific gravity of the water.

11. The process of claim 1 wherein the matrix is subsequently removed from contact with the water.

12. A process for reducing the menace of a floating water-borne pollutant which comprises applying to at least a portion of such pollutant a liquid composition containing a monomeric or oligomeric polymerizable ester of 2-cyanoacrylic acid or solution thereof, said ester diffusing at least partially into said pollutant and thereafter polymerizing to form a matrix with incorporation therein of at least a portion of said pollutant.

* * * * *